(12) United States Patent
Hung et al.

(10) Patent No.: US 8,752,967 B2
(45) Date of Patent: Jun. 17, 2014

(54) PROJECTION SYSTEM AND IMAGE PROCESSING METHOD THEREOF

(75) Inventors: Yung-Ching Hung, Hsin-Chu (TW); Meng-Chiou Liao, Hsin-Chu (TW)

(73) Assignee: Aptos Technology Inc., Hsin-Chu (TW)

( * ) Notice: Subject to any disclaimer, the term of this patent is extended or adjusted under 35 U.S.C. 154(b) by 419 days.

(21) Appl. No.: 13/272,225

(22) Filed: Oct. 13, 2011

(65) Prior Publication Data

US 2013/0027599 A1 Jan. 31, 2013

(30) Foreign Application Priority Data

Jul. 28, 2011 (TW) .............................. 100126797 A (51) Int. Cl.
*G03B 21/00* (2006.01)
(52) U.S. Cl.
USPC ................... 353/70; 353/28; 353/29; 353/42; 353/69; 353/98; 382/275; 382/287; 382/293; 348/601; 348/745
(58) Field of Classification Search
USPC ............... 353/28, 29, 30, 42, 46, 69–70, 94, 353/98–99, 122; 348/118, 123, 187, 333, 348/601, 744–747, E05.137, E17.002; 382/291, 153, 203, 275, 287, 293; 345/420, 421, 427, 582, 643
See application file for complete search history.

(56) References Cited

U.S. PATENT DOCUMENTS

| 5,235,363 | A | 8/1993 | Vogeley et al. | |
|---|---|---|---|---|
| 6,411,898 | B2 * | 6/2002 | Ishida et al. | 701/428 |
| 7,554,540 | B2 * | 6/2009 | Hayes | 345/421 |
| 8,229,208 | B2 * | 7/2012 | Pulla et al. | 382/154 |
| 8,442,313 | B2 * | 5/2013 | Kondo et al. | 382/167 |
| 2008/0018591 | A1 | 1/2008 | Pittel et al. | |

FOREIGN PATENT DOCUMENTS

TW I232343 5/2005

* cited by examiner

*Primary Examiner* — Sultan Chowdhury
(74) *Attorney, Agent, or Firm* — Jianq Chyun IP Office (57) ABSTRACT

A projection system and an image processing method thereof are provided. The system includes a projector module, a photography module and a processing module. The projector module projects a first image frame to an object surface. The photography module photographs the object surface to derive a second image frame including the first image frame and an indication point, wherein the indication point is formed by light projected on the object surface by an external device. The processing module analyzes the second image frame to derive coordinate of the indication point in the second image frame, derives coordinate of at least a feature point of the first image frame in the second image frame according to a linear-approximation method, and transforms the coordinates of the indication point in the second image frame to the coordinates in the first image frame by using two-dimensional coordinate transformation equations.

30 Claims, 5 Drawing Sheets

PROJECTION SYSTEM AND IMAGE PROCESSING METHOD THEREOF

CROSS-REFERENCE TO RELATED APPLICATION

This application claims the priority benefit of Taiwan application serial no. 100126797, filed on Jul. 28, 2011. The entirety of the above-mentioned patent application is hereby incorporated by reference herein and made a part of this specification.

BACKGROUND OF THE INVENTION

1. Field of the Invention

The invention relates to a display system. Particularly, the invention relates to a projection system and an image processing method thereof.

2. Description of Related Art

Generally, in an electronic presentation, a presenter connects a computer to a projector, and projects a presentation content pre-stored in the computer onto a screen through the projector. During the presentation, the presenter generally uses a presentation pen or a mouse to control a presentation flow and the presentation content, and in case that a briefing paragraph is required to be indicated, the presenter generally uses a laser pen or a cursor of the mouse to perform the indication.

However, when the presenter wants to note content on the presentation while briefing, the presenter has to use an inbuilt function of electronic presentation software, for example, the PowerPoint of the Microsoft Corp., and uses the cursor of the mouse in collaboration with a clicking function of a left key of the mouse. However, during the presentation, it is inconvenient to use the mouse and click the left key of the mouse, for example, the presenter needs to have a flat desktop around, or the presenter has to stay around the computer, which is quite inconvenient. Even if the presenter uses the presentation pen to control the cursor of the mouse, it is still not as convenient as directly using the laser pen to perform the indication.

SUMMARY OF THE INVENTION

The invention is directed to a projection system and an image processing method thereof, in which a photography module is used to photograph a projected image frame and identify positions of feature points and an indication point in the projected image frame.

The invention provides a projection system including a projector module, a photography module and a processing module. The projector module projects a first image frame to an object surface, where the first image frame includes a plurality of feature points. The photography module photographs the object surface to derive a second image frame containing the first image frame and an indication point, where the indication point is formed by light projected on the object surface by an external device. The processing module analyzes the second image frame to obtain coordinates of the indication point in the second image frame, performs a linear-approximation method to obtain coordinates of the feature points in the second image frame, and uses two-dimensional coordinate transformation equations to transform the coordinates of the indication point in the second image frame to coordinates of the indication point in the first image frame.

The invention provides an image processing method of a projection system, the method includes following steps. A first image frame is projected to an object surface, where the first image frame includes a plurality of feature points. The object surface is photographed to derive a second image frame containing the first image frame and an indication point, where the indication point is formed by light projected on the object surface by an external device. The second image frame is analyzed to obtain coordinates of the indication point in the second image frame. A linear-approximation method is performed to obtain coordinates of the feature points in the second image frame. Two-dimensional coordinate transformation equations are used to transform the coordinates of the indication point in the second image frame into coordinates of the indication point in the first image frame.

According to the above descriptions, the invention provides the projection system and the image processing method thereof, by which the photography module is used to photograph a projected image frame to obtain positions of the feature points and an indication point in the image frame, and obtain a corresponding position of the indication point in the projected image frame through coordinate transformation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
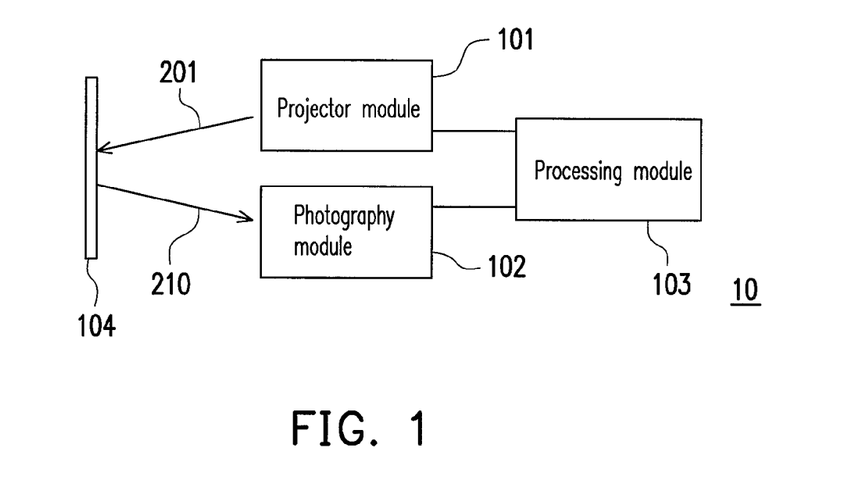
FIG. 1 is a block diagram of a projection system according to an exemplary embodiment of the invention.

FIG. 1 is a block diagram of a projection system according to an exemplary embodiment of the invention. Referring to FIG. 1, in the present embodiment, the projection system 10 includes a projector module 101, a photography module 102 and a processing module 103. The projector module 101 is connected to the processing module 103, and projects a first image frame 201 to an object surface 104, where the object surface 104 can be a screen, a white wall, etc., which is capable of clearly displaying the first image frame 201, though the invention is not limited thereto. The photography module 102 is connected to the processing module 103 for photographing the object surface 104 to derive a second image frame 210 containing the first image frame 201 and an indication point, where the indication point is formed by light projected on the object surface 104 by an external device, and the external device can be a laser pen or a presentation pen or other beam projectors, which is not limited by the invention.

Figure 2:
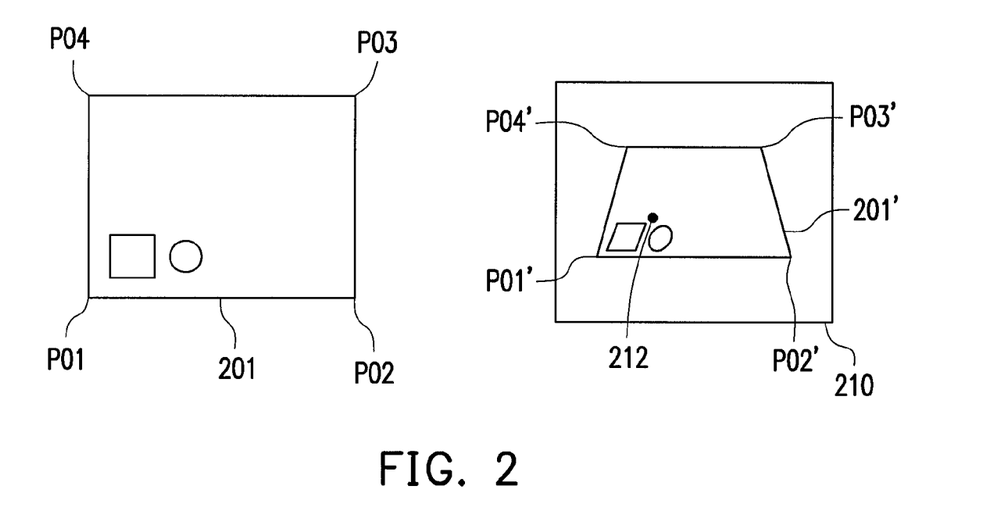
FIG. 2 is a schematic diagram illustrating a first image frame and a second image frame according to an exemplary embodiment of the invention.

FIG. 2 is a schematic diagram illustrating a first image frame and a second image frame according to an exemplary embodiment of the invention. Referring to FIG. 1 and FIG. 2, in the present embodiment, after the projector module 101 projects the first image frame 201 to the object surface 104, the photography module 102 photographs the object surface 104 to derive the second image frame 210, where the second image 210 includes a projected first image frame 201' and an indication point 212 formed by light projected on the object surface 104 by the external device (for example, the laser pen). The first image frame 201 includes a plurality of features points P01-P04. The photography module 102 photographs the features points P01-P04 to obtain projected feature points P01'-P-04', as that shown in FIG. 2.

Due to factors such as an included angle between a projection direction of the projector module 101 and a direction of a normal line of the object surface 104, a photographing angle of the photography module 102, and/or other factors, the projected first image frame 201' and the original first image frame 201 probably have differences in shape and size. Therefore, in order to obtain a position of the indication point 212 in the original first image frame 201, a transformation relationship between the projected first image frame 201' and the original first image frame 201 has to be derived first, i.e. a transformation relationship between the second image frame 210 and the first image frame 201 has to be derived first.

The processing module 103 receives the second image frame 210 from the photography module 102, and analyzes the second image frame 210 to obtain coordinates of the indication point 212 in the second image frame 210. The feature points P01-P04 are used to obtain the transformation relationship between the projected first image frame 201' in the second image frame 210 and the original first image frame 201. In the present embodiment, the feature points P01-P04 are set as four vertexes of the first image frame 201. The processing module 103 uses a linear-approximation method to obtain coordinates of the feature points P01-P04 in the second image frame 210. The linear-approximation method includes following operations. The processing module 103 performs threshold binarization on the second image frame 210 to obtain a third image frame, and uses one or a plurality of linear equations to move in the third image frame to find the coordinates of the feature points P01-P04 in the second image frame 210. The above steps are described in detail below with reference of figures.

In the linear-approximation method, the step of performing the threshold binarization on the second image frame 210 includes following steps. The processing module 103 defines a first threshold. The processing module 103 modifies a plurality of pixel data in the second image frame 210 that is greater than the first threshold to a bright grayscale value (for example, a maximum grayscale value or a white color grayscale value). Then, the processing module 103 modifies a plurality of pixel data in the second image frame 210 that is smaller than the first threshold to a dark grayscale value (for example, a minimum grayscale value or a black color grayscale value), and obtains the third image frame after completing the above steps. An effect that the processing module 103 performs the threshold binarization on the second image frame 210 is to divide a region of the projected first image frame 201' and a region without projected image frame in the second image frame 210.

Figure 3A:
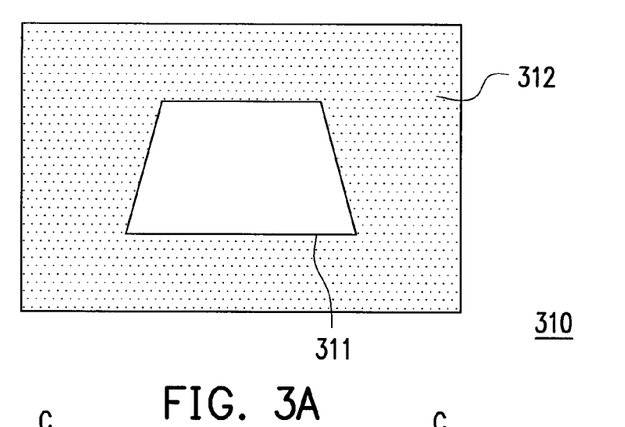
FIGS. 3A-3C are schematic diagrams of a linear-approximation method according to an exemplary embodiment of the invention.

FIG. 3A is a schematic diagram of a third image frame 310 obtained after performing the threshold binarization on the second image frame 210 according to an exemplary embodiment of the invention. Referring to FIG. 2 and FIG. 3A, a bright grayscale value region 311 formed by pixels of the bright grayscale value corresponds to the region of the projected first image frame 201' in the second image frame 210, and a dark grayscale value region 312 corresponds to the region without projected image frame in the second image frame 210.

Figure 3B:
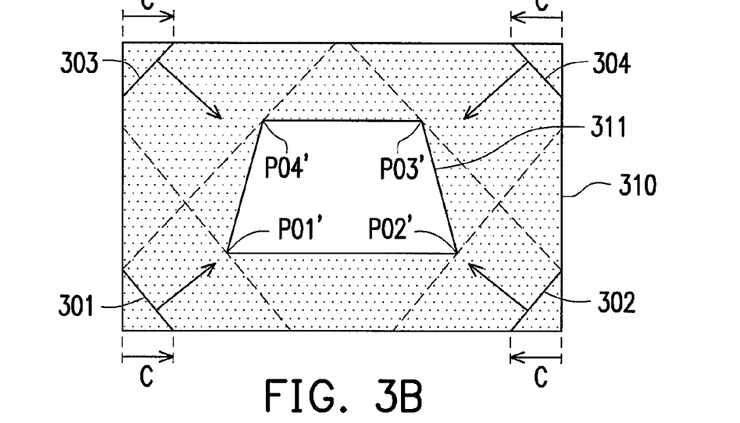

FIG. 3B is a schematic diagram of using one or a plurality of linear equations to move in the third image frame to find coordinates of the feature points in the second image frame according to the linear-approximation method in an exemplary embodiment of the invention. Referring to FIG. 3B, in the present embodiment, the feature points P01'-P04' to be found are four vertexes of the binarized first image frame 311, and four linear equations 301, 302, 303 and 304 are used to move in the third image frame 310. In the present embodiment, the four linear equations 301, 302, 303 and 304 are respectively:

$y=-x+c$  Linear equation 301:

$y=x-\text{size}x+c$  Linear equation 302:

$y=x+\text{size}y-c$  Linear equation 303:

$y=-x+\text{size}x+\text{size}y-c$  Linear equation 304:

Where, the parameter sizex is a width of the third image frame 310, i.e. a size of the third image frame 310 along an X-axis (a horizontal axis) direction. The parameter sizey is a height of the third image frame 310, i.e. a size of the third image frame 310 along a Y-axis (a vertical axis) direction. The parameter c is an intercept parameter varied when the linear equations 301, 302, 303 and 304 move in the third image frame 310, as that shown in FIG. 3B.

Referring to FIG. 2 and FIG. 3B, when the parameter c is 0, the linear equations 301, 302, 303 and 304 respectively pass through four corners of the third image frame 310. As the parameter c increases, the linear equations 301, 302, 303 and 304 respectively move from the four corners of the third image frame 310 towards a center of the third image frame 310. During the moving process, the grayscale luminance of a plurality of coordinate positions on the linear equations 301, 302, 303 and 304 are inspected, and the coordinate positions on the linear equations 301, 302, 303 and 304 respectively having the grayscale luminance greater than a second threshold for the first time are regarded as the coordinates of the feature points. Since the second image frame 210 and the third image frame 310 have the same size and have corresponding contents, coordinates of the four feature points in the third image frame 310 that are found according to the above steps are also equal to the coordinates of the four feature points in the second image frame 210.

Figure 3C:
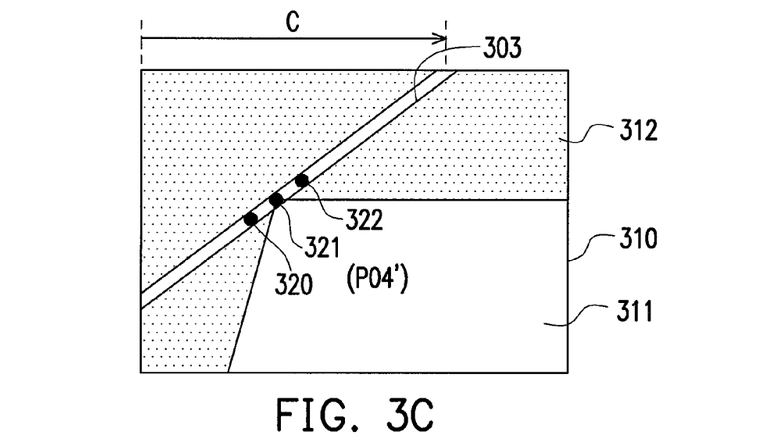

FIG. 3C is a partial enlarged schematic diagram of the third image frame 310 when the linear-approximation method is used to determine the coordinates of the feature point P04' in the third image frame 310 according to an exemplary embodiment of the invention. In FIG. 3C, the linear equation 303 is taken as an example for description, and descriptions of the other linear equations 301, 302 and 304 can refer to the related description of the linear equation 303. Referring to FIG. 3C, when the parameter c is increased by one step, the linear equation 303 moves one step towards the center of the third image frame 310. Each time after the third image frame 310 completes movement of one step, the processing module 103 inspects the grayscale luminance of a plurality of coordinate positions on the linear equation 303. Since the third image frame 310 has been binarized, before the linear equation 303 contacts the binarized first image frame 311, the grayscale value of each of the pixels on the linear equation 303 is a "dark grayscale value." When the linear equation 303 moves towards the center of the third image frame 310, if a bright grayscale value section is appeared in the pixels on the linear equation 303 for the first time, it represents that the linear equation 303 contacts the feature point P04'. For example, when the linear equation 303 moves to a position shown in FIG. 3C, if the processing module 103 inspects that the grayscale values of pixels 320, 321 and 322 on the linear equation 303 are respectively the dark grayscale value, the bright grayscale value and the dark grayscale value, the pixel 321 having the bright grayscale value is regarded as the feature point P04'. Therefore, coordinates of the pixel 321 can be regarded as the coordinates of the feature point P04' in the second image frame 210. It should be noticed that determination of high/low grayscale value pixel is a result obtained by comparing the grayscale value with the second threshold.

Although a situation that the grayscale values of the consecutive three pixels are respectively the dark grayscale value, the bright grayscale value and the dark grayscale value is taken as an example for description, the invention is not limited thereto, and in other embodiments, when the linear equation 303 moves towards the center to contact the binarized first image frame 311 for the first time, a plurality of pixels on the linear equation 303 are probably in the bright grayscale value section. According to a moving amount of each step of the linear equation 303 (for example, each step moves a distance of 5 pixels), when a plurality of the pixels on the linear equation 303 are appeared in the bright grayscale value section for the first time, the linear equation 303 may not just pass through the feature point P04'. Therefore, the processing module 103 can inspect whether the number of the pixels on the linear equation 303 that are appeared in the bright grayscale value section for the first time is smaller than a predetermined value. If the number of the pixels in the bright grayscale value section is smaller than the predetermined value, it represents that a distance between the linear equation 303 and the feature point P04' is within a tolerable error range, and the processing module 103 can regard coordinates of a central pixel of the bright grayscale value section as the coordinates of the feature point P04' in the second image frame 210. If the number of the pixels in the bright grayscale value section is greater than the predetermined value, the linear equation 303 moves backward (towards a direction opposite to the center of the third image frame 310) with a smaller step moving amount (for example, each step moves a distance of 1 pixel), until the number of the pixels in the bright grayscale value section is smaller than the predetermined value.

Referring to FIG. 1 and FIG. 2, after the coordinates of the feature points on the second image frame 210 are obtained, the processing module 103 further positions coordinates of the indication point 212 in the second image frame 210. In an embodiment of the invention, a color filter is disposed in a photographing path of the photography module 102, for example, if the indication point is projected by light of a specific color (for example, a red color), the red color filter is disposed in the photographing path of the photography module 102 to highlight a contrast of the indication point 212 in the second image frame 210. In other embodiments, when the projector module 101 projects the first image frame 201, a high luminance red point is configured at a position of each feature point. In this way, in the photographed second image frame 210 processed by the red filter, the feature points P01'-P04' are also highlighted. Similar to the method of highlighting the indication point and the feature points by using the color filter, the operation of filtering the other colors to highlight the indication point and the feature points can also be implemented by a software function of the processing module 103, which is not limited by the invention.

Referring to FIG. 1 and FIG. 2, in another embodiment of the invention, the processing module 103 transforms a plurality of pixel data of the second image frame 210 into a plurality of luminance data, for example, transforms from a color space formed by red, green and blue (RGB) to a color space formed by luminance, chrominance and chroma (YUV), and captures the color component of the luminance to serve as the luminance data. Since the luminance of the indication point 212 is greater than the luminance of any pixel in the second image frame 210, the processing module 103 sets a third threshold, and compares the third threshold with all of the luminance data of the second image frame 210. The processing module 103 regards the coordinates of the pixel with the luminance data greater than the third threshold in the second image frame 210 as the coordinates of the indication point 212 in the second image frame 210, the method of positioning the indication point 212 of the invention is not limited thereto.

Figure 4:
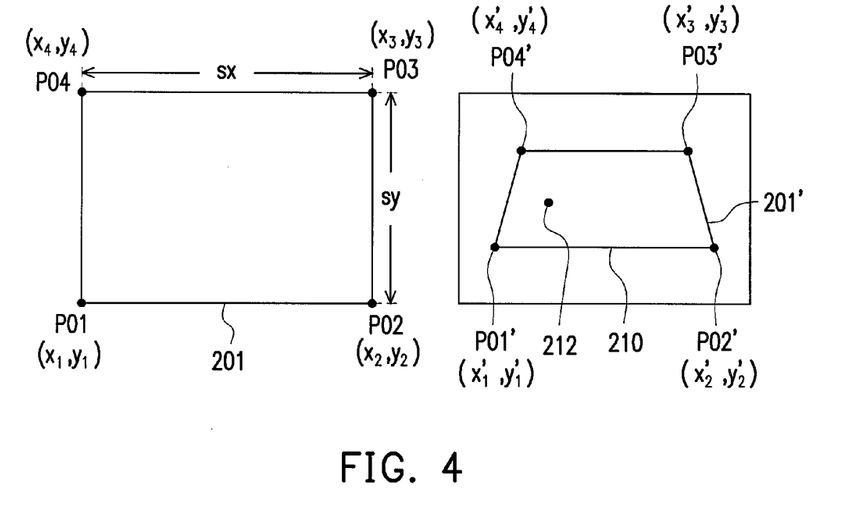
FIG. 4 is a schematic diagram of coordinate transformation according to an exemplary embodiment of the invention.

FIG. 4 is a schematic diagram of coordinate transformation according to an exemplary embodiment of the invention. Referring to FIG. 1 and FIG. 4, the coordinates of the feature points P01, P02, P03 and P04 in the first image frame 201 are respectively $(x_1,y_1)$, $(x_2,y_2)$, $(x_3,y_3)$ and $(x_4,y_4)$. The feature points P01, P02, P03 and P04 correspond to the feature points P01', P02', P03' and P04' in the second image frame 210, and the coordinates of the feature points P01', P02', P03' and P04' in the second image frame 210 are respectively $(x'_1,y'_1)$, $(x'_2,y'_2)$, $(x'_3,y'_3)$ and $(x'_4,y'_4)$. Here, it is defined that a width (a size along the X-axis) of the first image frame 201 is sx, and a height (a size along the Y-axis) of the first image frame 201 is sy. If the coordinates $(x_1,y_1)$ of the feature point P01 in the first image frame 201 is (0,0), the coordinates of the feature points P01, P02, P03 and P04 in the first image frame 201 are respectively as follows:

P01: $(x_1,y_1)=(0,0)$

P02: $(x_2,y_2)=(sx,0)$

P03: $(x_3,y_3)=(sx,sy)$

P04: $(x_4,y_4)=(0,sy)$

After the processing module 103 obtains the coordinates of the indication point 212 and the feature points P01', P02', P03' and P04' in the second image frame 210, two-dimensional coordinate transformation equations (1) and (2) can be used to transform the coordinates between the first image frame 201 and the second image frame 210.

$$x' = \sum_{j=0}^{m} \sum_{k=0}^{m} a_{jk} x^j y^k \qquad (1)$$

$$y' = \sum_{j=0}^{m} \sum_{k=0}^{m} b_{jk} x^j y^k \qquad (2)$$

Where, x and y are respectively coordinates of a pixel in the first image frame 201 along the X-axis and the Y-axis, and x' and y' are respectively coordinates of a pixel in the second image frame 210 along the X-axis and the Y-axis. The coefficients $a_{jk}$ and $b_{jk}$ are real numbers, and the coefficient m is an integer. The coefficients $a_{jk}$ and $b_{jk}$ are obtained according to a respective corresponding point of the first image frame 201 and the second image frame 210. For example, if m=0, the coefficients $a_{jk}$ and $b_{jk}$ are obtained according to the coordinates $(x_1,y_1)$ of the feature point P01 in the first image frame 201 and the coordinates $(x'_1,y'_1)$ of the feature point P01' in the second image frame 210.

The higher the value m is, the higher variation of geometric distortion is processed. For example, in the present embodiment, m=1, though the invention is not limited thereto. By applying m=1 to the formulas (1) and (2), formulas (3) and (4) are obtained:

$$x' = a \times x + b \times y + c \times x \times y + d \quad (3)$$

$$y' = e \times x + f \times y + g \times x \times y + h \quad (4)$$

Where, (x,y) is coordinates of a pixel in the first image frame 201, and (x',y') is coordinates of a pixel in the second image frame 210. By applying the coordinates $(x_1,y_1)$, $(x_2,y_2)$, $(x_3,y_3)$ and $(x_4,y_4)$ of the feature points P01, P02, P03 and P04 in the first image frame 201 and the coordinates $(x'_1,y'_1)$, $(x'_2,y'_2)$ $(x'_3,y'_3)$ and $(x'_4,y'_4)$ of the feature points P01', P02', P03' and P04' in the second image frame 210 to the formulas (3) and (4), the coefficients a, b, c, d, e, f, g and h are obtained. The coefficients in the two-dimensional coordinate transformation equations (3) and (4) are as follows.

$$d = x'_1$$

$$h = y'_1$$

$$a = \frac{x'_2 - d}{sx}$$

$$e = \frac{y'_2 - h}{sy}$$

$$b = \frac{x'_3 - a \times sx - b \times sy - d}{sx \times sy}$$

$$g = \frac{y'_3 - e \times sx - f \times sy - h}{sx \times sy}$$

The aforementioned two-dimensional coordinate transformation equations (3) and (4) are suitable for transforming the coordinates (x,y) of the first image frame 201 into the coordinates (x',y') of the second image frame 210, and it is relatively complicated to transform the coordinates (x',y') of the second image frame 210 into the coordinates (x,y) of the first image frame 201. Therefore, in an embodiment of the invention, the processing module 103 can use a bisection-approximation method to obtain the corresponding coordinates of the indication point 212 in the first image frame 201.

Figure 5:
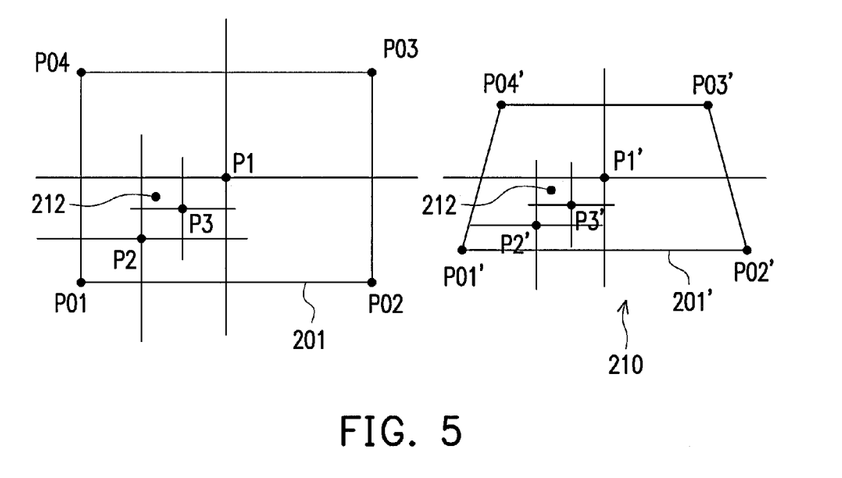
FIG. 5 is a schematic diagram illustrating a bisection-approximation method according to an exemplary embodiment of the invention.

FIG. 5 is a schematic diagram illustrating a bisection-approximation method according to an exemplary embodiment of the invention. Referring to FIG. 1 and FIG. 5, first, the processing module 103 averages the coordinates of the feature points P01, P02, P03 and P04 in the first image frame 201 to obtain coordinates of a calculated point P1, and then transforms the coordinates of the calculated point P1 to coordinates of the corresponding calculated point P1' in the second image frame 210 through the aforementioned two-dimensional coordinate transformation equations (3) and (4). Then, the coordinates of the calculated point P r and the coordinates of the indication point 212 in the second image frame 210 are compared to obtain relative quadrant positions of the indication point 212 and the calculated point P1' in the second image frame 210 (i.e. the indication point 212 is located at lower left of the calculated point P1'), so that a possible range of the indication point 212 is reduced to a quarter.

As shown in FIG. 5, since the indication point 212 falls in a third quadrant area of the calculated point P1', a next calculated point P2 in the first image frame 201 is obtained by averaging the coordinates of the calculated point P1 and the coordinates of the feature point P01. Then, the processing module 103 again transforms the coordinates of the calculated point P2 in the first image frame 201 to coordinates of the corresponding calculated point P2' in the second image frame 210 through the aforementioned two-dimensional coordinate transformation equations (3) and (4). Then, the processing module 103 compares the coordinates of the calculated point P2' and the coordinates of the indication point 212 in the second image frame 210 to learn that the indication point 212 falls in a first quadrant area of the calculated point P2'.

Deduced by analogy, the processing module 103 averages the coordinates of the calculated point P2 and the coordinates of the calculated point P1 to obtain a next calculated point P3, and then the processing module 103 again transforms the coordinates of the calculated point P3 in the first image frame 201 to coordinates of the corresponding calculated point P3' in the second image frame 210 through the aforementioned two-dimensional coordinate transformation equations (3) and (4). Then, the processing module 103 compares the coordinates of the calculated point P3' and the coordinates of the indication point 212 in the second image frame 210 to learn that the indication point 212 falls in a second quadrant area of the calculated point P3'. The processing module 103 uses the same bisection-approximation method to move the calculated points until a distance between the calculated point Pn (not shown) and the indication point 212 in the second image frame 210 is less than a fourth threshold. Then, the processing module 103 takes the coordinates of the final calculated point Pn in the first image frame 201 as the coordinates of the indication point 212 in the first image frame 201.

Referring to FIG. 1 and FIG. 5, in an embodiment of the invention, after the processing module 103 obtains the coordinates of the indication point in the first image frame 201, when the processing module 103 determines that the indication point 212 is located at a predetermined region of the first image frame 201, the processing module 103 triggers a predetermined function corresponding to the predetermined region. For example, the first image frame 201 includes a virtual button, and when the indication point 212 points to the region of the virtual button, a function such as page turning, zooming in or zooming out, etc. is triggered, or according to the position of the indication point 212, a function the same as using a mouse to click the region is triggered, though the invention is not limited thereto.

When the user moves the indication point 212, the processing module 103 continually detects the coordinates of the indication point 212 in the first image frame 201 to obtain a plurality of track points (not shown). The processing module 103 links the track points according to a time sequence to form a moving track of the indication point 212. Moreover, the processing module 103 also sets a time threshold and counts a time interval between two adjacent track points in the time sequence. When the time interval between two adjacent track points in the time sequence is greater than the time threshold, the two adjacent track points are not linked.

Moreover, while the processing module 103 continually detects the moving track, it also draws the moving track on a transparent layer. Then, the processing module 103 superposes the transparent layer on the first image frame 201, and projects the superposed transparent layer and the first image frame 201 onto the object surface 104 altogether through the projector module 101. Namely, the projection system 10 displays the moving track of the indication point 212 in the first image frame 201 in a superposing manner. Moreover, in an embodiment of the invention, the processing module 103 projects the first image frame 201 onto the object surface 104 through the projector module 101 according to a first presentation file, and after the processing module 103 obtains the moving track of the indication point 212, it stores the transparent layer containing the moving track in a second presentation file. It should be noticed that in the present embodiment, one or a plurality of indication points can be detected, and the indication points are continually detected and a moving track thereof is recorded and drawn in the transparent layer, and is stored in the second presentation file.

Figure 6:
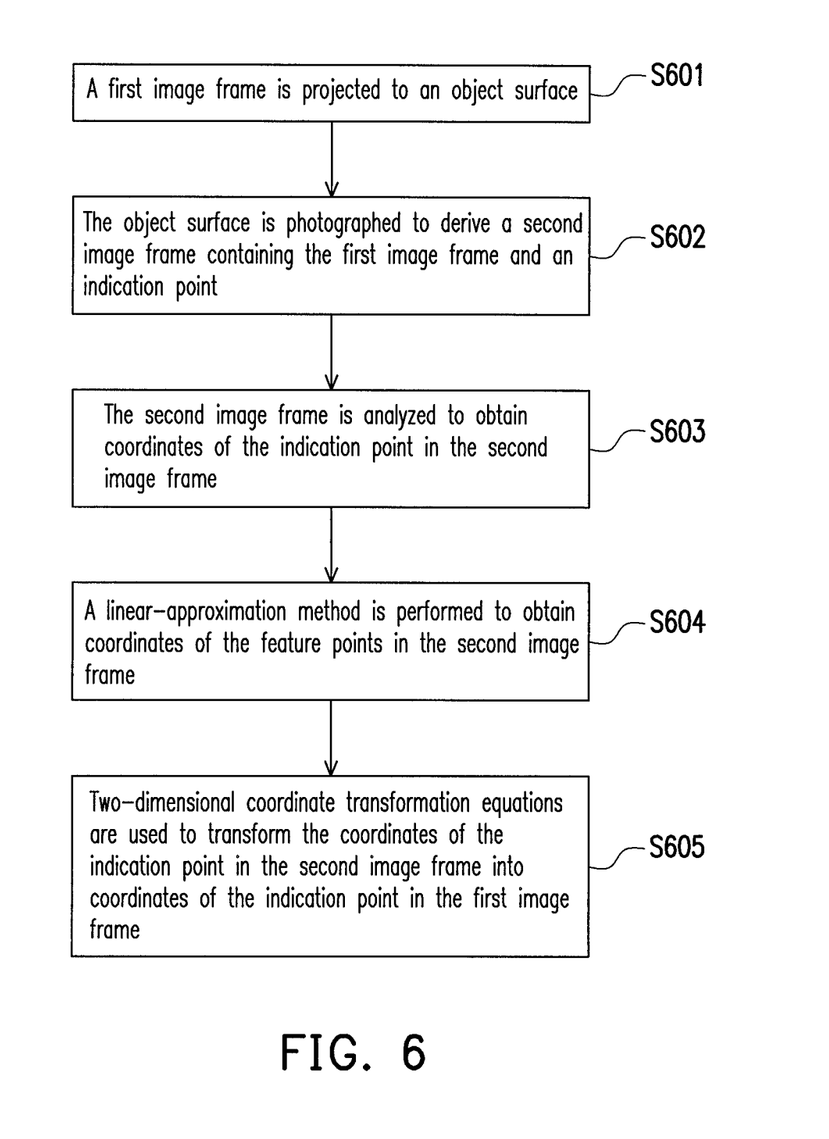
FIG. 6 is a flowchart illustrating an image processing method of a projection system according to an exemplary embodiment of the invention.

FIG. 6 is a flowchart illustrating an image processing method of a projection system according to an exemplary embodiment of the invention. Referring to FIG. 6, the image processing method includes following steps. A first image frame is projected to an object surface (S601), where the first image frame includes a plurality of feature points. The object surface is photographed to derive a second image frame containing the first image frame and an indication point (S602), where the indication point is formed by light projected on the object surface by an external device. The second image frame is analyzed to obtain coordinates of the indication point in the second image frame (S603). A linear-approximation method is performed to obtain coordinates of the feature points in the second image frame (S604). Two-dimensional coordinate transformation equations are used to transform the coordinates of the indication point in the second image frame into coordinates of the indication point in the first image frame (S605). Moreover, implementation details of the above steps have been described in detail in descriptions of the aforementioned embodiments, which are not repeated herein.

Figure 7:
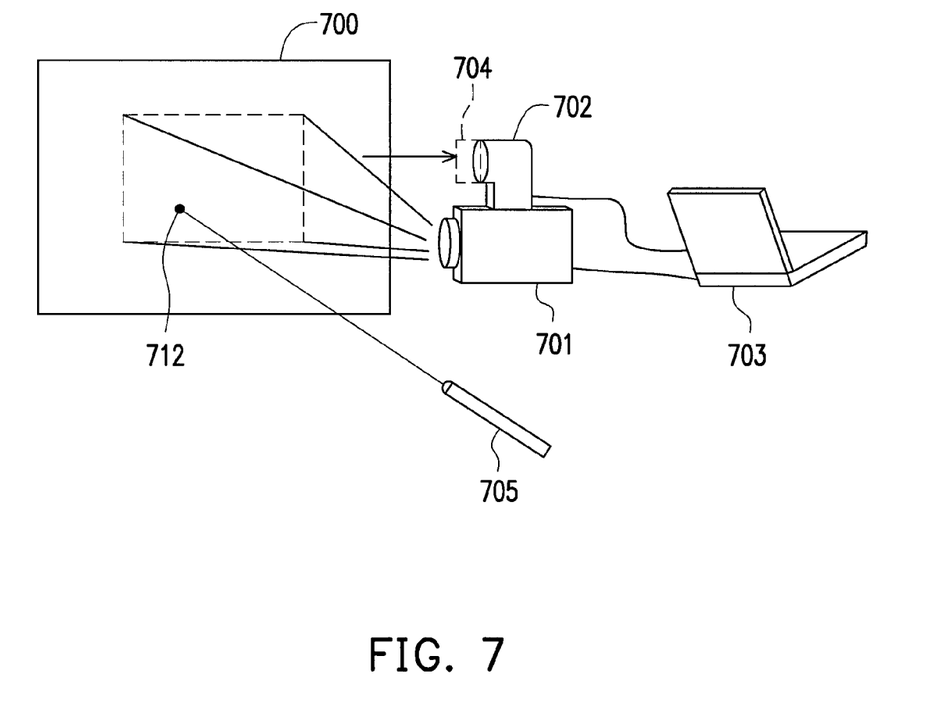
FIG. 7 is an implementation of a projection system according to an exemplary embodiment of the invention.

FIG. 7 is an implementation of a projection system according to an exemplary embodiment of the invention. Referring to FIG. 1 and FIG. 7, in the present embodiment, a screen 700 is used to implement the object surface 104, a projector 701 is used to implement the projector module 101, a video camera 702 is used to implement the photography module 102, and a personal computer 703 is used to implement the processing module 103. The projector 701 is connected to the personal computer 703 to project image data (i.e. the first image frame 201) of the personal computer 703 onto the screen 700. The video camera 702 with a color filter 704 disposed in front of its lens is connected to the personal computer 703, and photographs and records a content displayed on the screen 700 to produce the aforementioned second image frame 210. Moreover, a laser pen 705 projects light on the screen 700 to produce an indication point 712. In other embodiments, the projector module 101, the photography module 102 and/or the processing module 103 can also be integrated into a same device. For example, the photography module 102 and the processing module 103 can be integrated into a notebook or a smart phone having a video camera function. For another example, the projection system 10 is a smart phone, and the smart phone is inbuilt with a micro projector (the projector module 101) and a camera (the photography module 102). However, the invention is not limited to the above implantations.

In summary, the invention provides the projection system and the image processing method thereof, by which convenience of using a projection apparatus for presentation is improved without using additional special devices. In the invention, the position of the indication point projected by the external device can be directly detected and a track thereof can be recorded, which is equivalent to directly use the indication point to note a content of the presentation and stores it in a file. Moreover, the position of the indication point can be used to directly trigger a predetermined function, for example, a clicking function of the mouse, etc., so that the user can make the presentation in a more initiative manner.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A projection system, comprising:
a projector module, projecting a first image frame to an object surface, wherein the first image frame comprises a plurality of feature points;
a photography module, photographing the object surface to derive a second image frame containing the first image frame and an indication point, wherein the indication point is formed by light projected on the object surface by an external device; and
a processing module, analyzing the second image frame to obtain coordinates of the indication point in the second image frame, performing a linear-approximation method to obtain coordinates of the feature points in the second image frame, and using two-dimensional coordinate transformation equations to transform the coordinates of the indication point in the second image frame to coordinates of the indication point in the first image frame.

2. The projection system as claimed in claim 1, wherein the linear-approximation method comprises performing threshold binarization on the second image frame to obtain a third image frame, and using at least one linear equation to move in the third image frame, so as to find the coordinates of the feature points in the second image frame.

3. The projection system as claimed in claim 2, wherein the step of performing the threshold binarization on the second image frame comprises defining a first threshold; modifying a plurality of pixel data in the second image frame that is greater than the first threshold to a bright grayscale value; and modifying a plurality of pixel data in the second image frame that is smaller than the first threshold to a dark grayscale value.

4. The projection system as claimed in claim 2, wherein the at least one linear equation moves from a corner of the third image frame towards a center of the third image frame, and during the moving process, grayscale luminance of a plurality of coordinate positions on the at least one linear equation is inspected, and the coordinate position on the at least one linear equation having the grayscale luminance greater than a second threshold for the first time is regarded as the coordinates of one of the feature points in the second image frame.

5. The projection system as claimed in claim 2, wherein the linear-approximation method further comprises making the projector module to improve luminance of the feature points.

6. The projection system as claimed in claim 1, wherein a color filter is disposed in a photographing path of the photography module to highlight the indication point and the feature points.

7. The projection system as claimed in claim 1, wherein the processing module transforms a plurality of pixel data of the second image frame to a plurality of luminance data, and regards a coordinate position with the luminance data greater than a third threshold as the coordinates of the indication point in the second image frame.

8. The projection system as claimed in claim 1, wherein the two-dimensional coordinate transformation equations are $$x' = \sum_{j=0}^{m}\sum_{k=0}^{m} a_{jk}x^{j}y^{k} \text{ and } y' = \sum_{j=0}^{m}\sum_{k=0}^{m} b_{jk}x^{j}y^{k},$$

wherein x and y represent coordinates in the first image frame, and x' and y' represent coordinates in the second image frame, the coefficients $a_{jk}$ and $b_{jk}$ are real numbers, and the coefficient m is an integer.

9. The projection system as claimed in claim 1, wherein the two-dimensional coordinate transformation equations are x'=a×x+b×y+c×x×y+d and y'=e×x+f×y+g×x×y+h, wherein x and y represent coordinates in the first image frame, and x' and y' represent coordinates in the second image frame, d=$x_1$', h=$y_1$', a=($x_2$'−d)÷sx, e=($y_2$'−h)÷sy, b=($x_3$'−a×sx−b×sy−d)÷(sx×sy), g=($y_3$'−e×sx−f×sy−h)÷(sx×sy), $x_1$' and $y_1$' are coordinates of a first feature point of the feature points in the second image frame, $x_2$' and $y_2$' are coordinates of a second feature point of the feature points in the second image frame, $x_3$' and $y_3$' are coordinates of a third feature point of the feature points in the second image frame, sx is a distance between the first feature point and the second feature point in the first image frame, and sy is a distance between the second feature point and the third feature point in the first image frame.

10. The projection system as claimed in claim 9, wherein the processing module uses the two-dimensional coordinate transformation equations to transform coordinates of a calculated point in the first image frame to coordinates of the calculated point in the second image frame, compares the coordinates of the calculated point and the coordinates of the indication point in the second image frame, uses a bisection-approximation method to move the calculated point to approach the indication point, and takes coordinates of the calculated point in the first image frame as the coordinates of the indication point in the first image frame.

11. The projection system as claimed in claim 1, wherein the processing module continually detects the coordinates of the indication point in the first image frame to obtain a plurality of track points, and links the track points according to a time sequence.

12. The projection system as claimed in claim 11, wherein the processing module counts a time interval between two adjacent track points in the time sequence, and when the time interval is greater than a time threshold, the two adjacent track points are not linked.

13. The projection system as claimed in claim 1, wherein when the processing module determines that the indication point is located at a predetermined region of the first image frame, the processing module triggers a predetermined function corresponding to the predetermined region.

14. The projection system as claimed in claim 1, wherein the processing module continually detects a moving track of the indication point in the first image frame, draws the moving track on a transparent layer, and projects the transparent layer to the object surface through the projector module, wherein the transparent layer superposes the first image frame.

15. The projection system as claimed in claim 14, wherein the processing module projects the first image frame to the object surface through the projector module according to a first presentation file, and the processing module stores the transparent layer containing the moving track in a second presentation file.

16. An image processing method of a projection system, comprising:
    projecting a first image frame to an object surface, wherein the first image frame comprises a plurality of feature points;
    photographing the object surface to derive a second image frame containing the first image frame and an indication point, wherein the indication point is formed by light projected on the object surface by an external device;
    analyzing the second image frame to obtain coordinates of the indication point in the second image frame;
    performing a linear-approximation method to obtain coordinates of the feature points in the second image frame; and
    using two-dimensional coordinate transformation equations to transform the coordinates of the indication point in the second image frame into coordinates of the indication point in the first image frame.

17. The image processing method of the projection system as claimed in claim 16, wherein the linear-approximation method comprises:
    performing threshold binarization on the second image frame to obtain a third image frame; and
    using at least one linear equation to move in the third image frame, so as to find the coordinates of the feature points in the second image frame.

18. The image processing method of the projection system as claimed in claim 17, wherein the step of performing the threshold binarization on the second image frame comprises:
    defining a first threshold;
    modifying a plurality of pixel data in the second image frame that is greater than the first threshold to a bright grayscale value; and
    modifying a plurality of pixel data in the second image frame that is smaller than the first threshold to a dark grayscale value.

19. The image processing method of the projection system as claimed in claim 17, wherein the step of finding the coordinates of the feature points in the second image frame comprises:
    moving the at least one linear equation from a corner of the third image frame towards a center of the third image frame;
    during the moving process, inspecting grayscale luminance of a plurality of coordinate positions on the at least one linear equation; and
    during the moving process, regarding the coordinate position on the at least one linear equation having the grayscale luminance greater than a second threshold for the first time as the coordinates of one of the feature points in the second image frame.

20. The image processing method of the projection system as claimed in claim 17, wherein the linear-approximation method further comprises:
    making the projector module to improve luminance of the feature points.

21. The image processing method of the projection system as claimed in claim 16, further comprising:
    disposing a color filter in a photographing path of the photography module to highlight the indication point and the feature points.

22. The image processing method of the projection system as claimed in claim 16, further comprising:

transforming a plurality of pixel data of the second image frame to a plurality of luminance data; and regarding a coordinate position with the luminance data greater than a third threshold as the coordinates of the indication point in the second image frame.

23. The image processing method of the projection system as claimed in claim 16, wherein the two-dimensional coordinate transformation equations are $$x' = \sum_{j=0}^{m}\sum_{k=0}^{m} a_{jk} x^j y^k \text{ and } y' = \sum_{j=0}^{m}\sum_{k=0}^{m} b_{jk} x^j y^k,$$

wherein x and y represent coordinates in the first image frame, and x' and y' represent coordinates in the second image frame, the coefficients $a_{jk}$ and $b_{jk}$ are real numbers, and the coefficient m is an integer.

24. The image processing method of the projection system as claimed in claim 16, wherein the two-dimensional coordinate transformation equations are x'=a×x+b×y+c×x×y+d and y'=e×x+f×y+g×x×y+h, wherein x and y represent coordinates in the first image frame, and x' and y' represent coordinates in the second image frame, d=$x_1$', h=$y_1$', a=($x_2$'−d)÷sx, e=($y_2$'−h)÷sy, b=($x_3$'−a×sx−b×sy−d)÷(sx×sy), g=($y_3$'−e×sx−f×sy−h)÷(sx×sy), $x_1$' and $y_1$' are coordinates of a first feature point of the feature points in the second image frame, $x_2$' and $y_2$' are coordinates of a second feature point of the feature points in the second image frame, $x_3$' and $y_3$' are coordinates of a third feature point of the feature points in the second image frame, sx is a distance between the first feature point and the second feature point in the first image frame, and sy is a distance between the second feature point and the third feature point in the first image frame.

25. The image processing method of the projection system as claimed in claim 24, wherein the step of using the two-dimensional coordinate transformation equations comprises:

using the two-dimensional coordinate transformation equations to transform coordinates of a calculated point in the first image frame to coordinates of the calculated point in the second image frame;

comparing the coordinates of the calculated point and the coordinates of the indication point in the second image frame;

using a bisection-approximation method to move the calculated point to approach the indication point; and taking coordinates of the calculated point in the first image frame as the coordinates of the indication point in the first image frame.

26. The image processing method of the projection system as claimed in claim 16, further comprising:

continually detects the coordinates of the indication point in the first image frame to obtain a plurality of track points; and linking the track points according to a time sequence.

27. The image processing method of the projection system as claimed in claim 26, further comprising:

counting a time interval between two adjacent track points in the time sequence; and not to link the two adjacent track points when the time interval is greater than a time threshold.

28. The image processing method of the projection system as claimed in claim 16, further comprising:

when the indication point is located at a predetermined region of the first image frame, triggering a predetermined function corresponding to the predetermined region.

29. The image processing method of the projection system as claimed in claim 16, further comprising:

continually detecting a moving track of the indication point in the first image frame;

drawing the moving track on a transparent layer; and projecting the transparent layer to the object surface, wherein the transparent layer superposes the first image frame.

30. The image processing method of the projection system as claimed in claim 29, wherein the first image frame is a content of a first presentation file, and the image processing method further comprises:

storing the transparent layer containing the moving track in a second presentation file.

\* \* \* \* \*